(12) United States Patent
Kuth et al.

(10) Patent No.: US 7,555,654 B2
(45) Date of Patent: Jun. 30, 2009

(54) APPARATUS, TRANSPONDER, COMPUTER PROGRAM PRODUCT AND METHOD FOR ENABLING AN ACTIVE PART OF A COMPUTER PROGRAM

(75) Inventors: Rainer Kuth, Herzogenaurach (DE); Martin Requardt, Nuremberg (DE); Markus Vester, Nuremberg (DE); Christoph Zindel, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 825 days.

(21) Appl. No.: 10/291,016

(22) Filed: Nov. 8, 2002

(65) Prior Publication Data

US 2003/0110260 A1 Jun. 12, 2003

(30) Foreign Application Priority Data

Nov. 9, 2001 (DE) ................. 101 55 092

(51) Int. Cl.
*H04L 9/32* (2006.01)
(52) U.S. Cl. .............. 713/185; 713/192; 713/194; 726/9; 726/20; 235/382
(58) Field of Classification Search ............ 726/2, 726/22, 20, 9, 26, 27, 28, 16, 17, 21; 713/185, 713/187, 192, 194; 235/382; 711/10, 163, 711/164
See application file for complete search history.

(56) References Cited

U.S. PATENT DOCUMENTS

| | | | |
|---|---|---|---|
| 5,736,935 A * | 4/1998 | Lambropoulos | 340/825.69 |
| 5,761,609 A | 6/1998 | Chen | 455/26 |
| 5,822,771 A * | 10/1998 | Akiyama et al. | 711/162 |
| 5,870,726 A * | 2/1999 | Lorphelin | 705/400 |
| 6,070,240 A * | 5/2000 | Xydis | 726/17 |
| 6,154,136 A * | 11/2000 | Van Eeden | 340/572.1 |
| 6,449,651 B1 * | 9/2002 | Dorfman et al. | 709/229 |
| 7,134,138 B2 * | 11/2006 | Scherr | 726/2 |
| 2003/0093247 A1* | 5/2003 | Enea | 702/188 |
| 2004/0025035 A1* | 2/2004 | Jean-Claude et al. | 713/189 |

FOREIGN PATENT DOCUMENTS

| | | |
|---|---|---|
| JP | 7046233 | 2/1995 |
| JP | 2000047866 | 2/2000 |
| WO | WO 94/26043 | 11/1994 |
| WO | WO 99/11022 | 3/1999 |

OTHER PUBLICATIONS

Patent Abstracts of Japan Publication No. 11031131 A.

* cited by examiner

*Primary Examiner*—Kimyen Vu
*Assistant Examiner*—Edward Zee
(74) *Attorney, Agent, or Firm*—Schiff Hardin LLP

(57) ABSTRACT

A computer program product has a check routine and an active part. When the computer program product is called, a computer, while processing the check routine, initiates a transmitter to send a launch signal. A transponder receives this signal, checks whether a time-dependent and/or usage-dependent transmission condition is met and transmits an enable code as warranted. A receiver receives the enable code and communicates it to the computer. The computer checks the enable code and undertakes processing of the active part only when the enable code satisfies an enable condition.

21 Claims, 4 Drawing Sheets

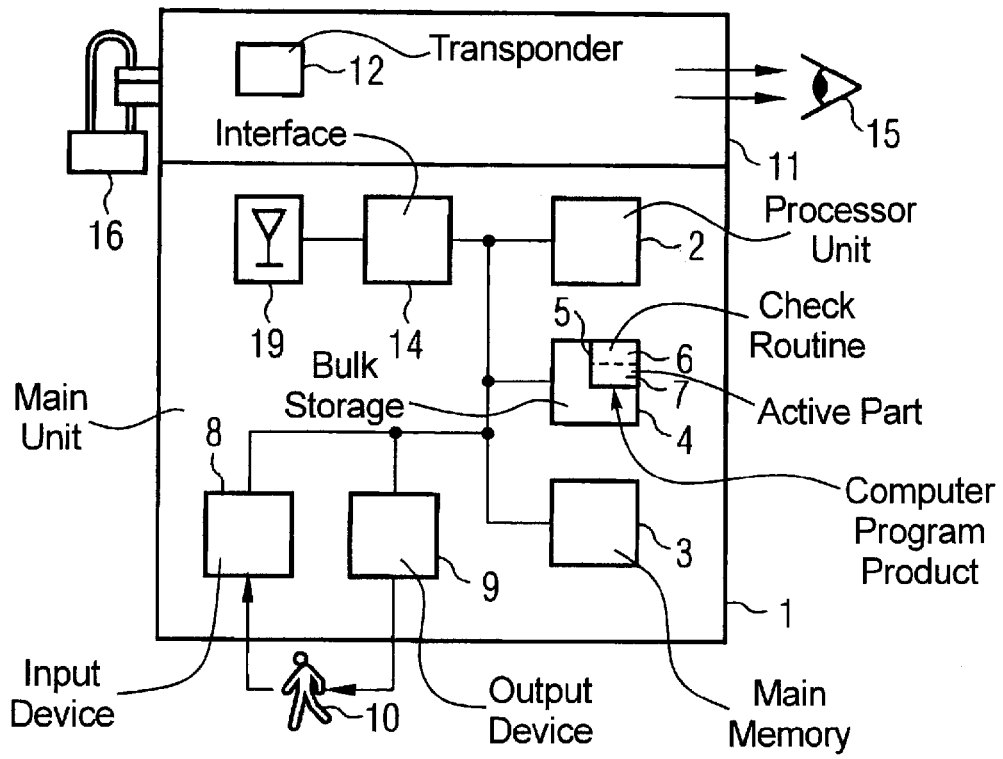
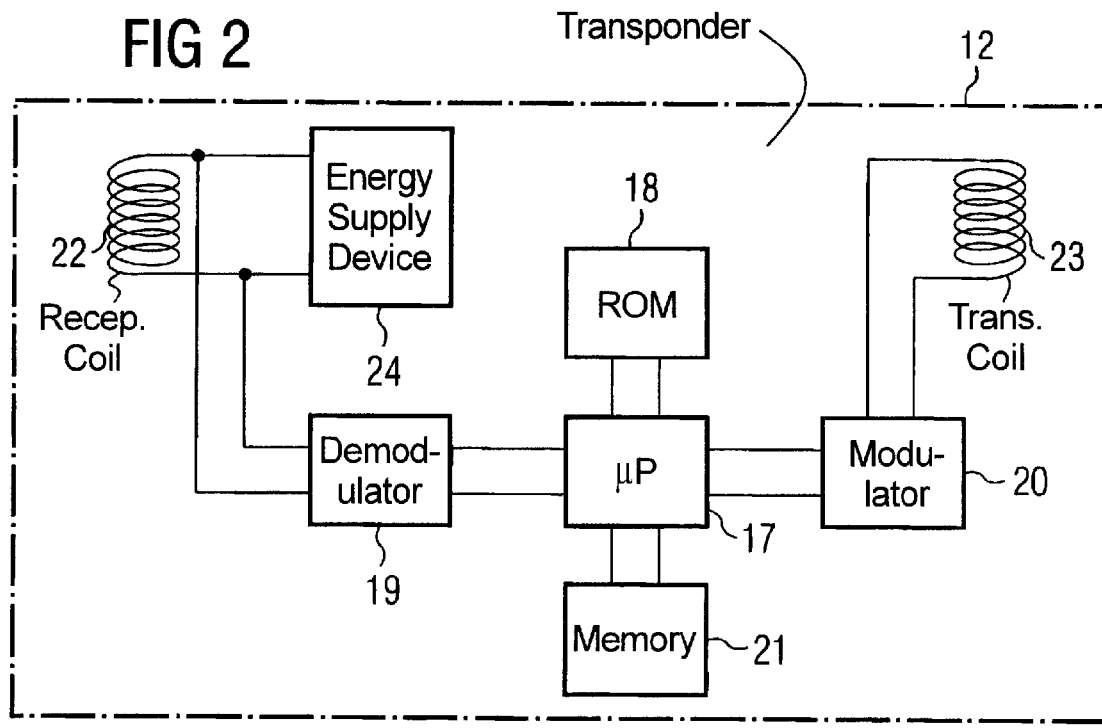

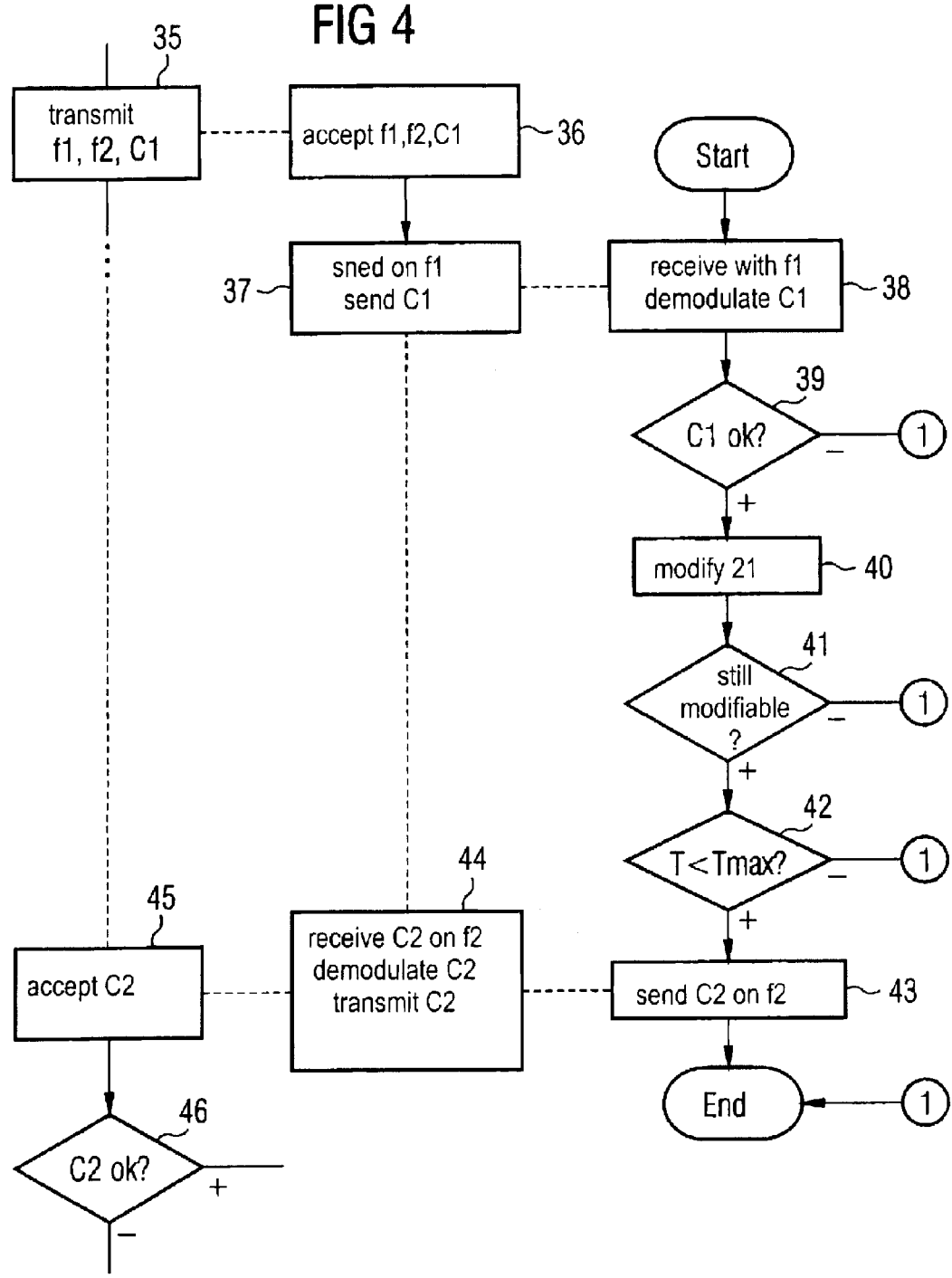

APPARATUS, TRANSPONDER, COMPUTER PROGRAM PRODUCT AND METHOD FOR ENABLING AN ACTIVE PART OF A COMPUTER PROGRAM

BACKGROUND OF THE INVENTION

1. Field of the Invention

The present invention is directed to a method for enabling an active (payload, useful, etc.) part of a computer program product that is processed by a computer.

2. Description of the Prior Art

Many methods for enabling an active part of a computer program are known. In these known methods, the computer checks an enable code for satisfaction of an enable condition while processing a check routine of the computer program product at least when the computer program product is called, and undertakes the processing of the active part only when the enable condition is satisfied.

For example, it is known to place a dongle onto an interface of the computer. When the computer program product is called, the computer drives the interface while processing the check routine and reads the enable code from the dongle. The processing of the active part is started only when the enable code is proper, i.e. the enable condition is satisfied. A disadvantageous of this method is that each dongle occupies an interface. Further, a not inconsiderable cost outlay is required for the dongle itself. Moreover, the security against counterfeiting the dongle or the code is only limited.

It is also known to supply the enable code to the program upon installation on the hard disk of the computer or at a later point in time, either manually or remotely loaded. Given manual entry, the input is complicated and susceptible to error. A network connection is required given remote loading of the enable code.

PCT Application WO 99/11022 discloses an enable method for a computer. In this enable method, the computer initiates a transmitter connected to the computer to send a launch signal. A transponder separated from the computer receives the launch signal and sends an enable code in response thereto. A receiver connected to the computer receives the enable code and communicates it to the computer. The computer checks the enable code for satisfaction of an enable condition and communicates with a user when the enable condition is satisfied.

SUMMARY OF THE INVENTION

An object of the present invention is to provide an enable method and corresponding devices with which a dependable enabling of the active part is possible—particularly for only a limited time—in a simple, economical and reliable way.

This object is achieved in accordance with the invention in a method wherein the computer, while processing a check routine of the computer program product, initiates a transmitter connected to the computer to send a launch signal at least when the computer program product is called, a transponder separate from the computer receives the launch signal, the transponder subsequently checks whether a time-dependent and/or usage-dependent transmission condition has been satisfied and transmits an enable code only when the transmission condition has been satisfied, and a receiver connected to the computer receives the enable code and communicates it to the computer.

Preferably, the enable method also should prevent having the program installed simultaneously on different computers and then being started successively on different computers by sharing the transponder by making it briefly available to each computer. In order to prevent such an abuse, in an embodiment of the method the computer undertakes processing of the check routine from time to time as a branch out of the processing of the active part and, while processing the check routine, again initiates the transmitter to send the launch signal, the transponder again receives the launch signal, the transponder subsequently checks again whether the transmission condition is satisfied and retransmits the enable code only when the transmission condition has been satisfied again, the receiver again receives the enable code and communicates it to the computer, the computer, while continuing to process the check routine, again checks the enable code for satisfaction of the enable condition and only continues processing the active part only when the enable code again satisfies the enable condition.

When the enable condition is dependent on the absolute time, the relative time and/or on the number of calls of the computer program product, a type of subscription can be realized in a simple way. For example, the computer compares the enable code to a reference code that it determines using an absolute time that is made available to it by a clock module of the computer. The computer also can internally store the number of calls or the usage time (relative time) of the computer program product and check the enable code for satisfaction of the enable condition using these quantities.

The checking of the enable condition ensues in the computer. Manipulations by a user of the computer with fraudulent intent therefore cannot be precluded with certainty. By checking the transmission condition, however, such manipulations can be precluded with a probability that borders on certainty.

The checking of the transmission condition, for example, can be a check of an absolute time condition. The absolute time can be optionally prescribed for the transponder either by an internal timer of the transponder or by the computer.

Alternatively or additionally, the transponder can modify an internal transponder memory dependent on a usage of the computer program product. In this case, the check of the transmission condition is a check of an internal transponder memory for satisfaction of a memory status.

Manipulations are completely impossible when the modification of the internal transponder memory is irreversible.

The enable method functions even more securely in an embodiment wherein the transmitter communicates a launch code to the transponder in the launch signal, the transponder checks the launch code for satisfaction of a launch condition, and the transponder sends the enable code only when the launch condition has been satisfied.

The transmitter can be operated more flexibly in an embodiment wherein the computer informs the transmitter of the launch code that the transmitter should communicate to the transponder. By communicating different launch codes, it is possible to selectively address different transponders with the same transmitter by transmitting the launch signal on one and the same frequency, the different transponders having different launch codes allocated to different programs.

When the launch code is personalized, then the code is unambiguously specific for only one specific computer and/or one specific user.

In a further embodiment, upon every communication of the enable code, the computer checks the enable code for satisfaction of at least one code condition, increments a counter allocated to the code condition when the code condition is satisfied, checks this counter for satisfaction of a counter condition upon incrementation of the counter, and undertakes or continues the processing of the active part only when the counter condition is met. This makes it possible to prevent abuse as may occur if multiple transponders are provided to a group of users.

When the computer sends the transmitter a transmission frequency on which the transmitter should sent the launch signal, then it is possible to use a single transmitter to address a number of different transponders that can be launched by means of different frequencies. Alternatively, broadband transmission of the launch signal is also possible.

When the computer sends the receiver a reception frequency on which the receiver should receive the enable code, then it is analogously possible to receive enable codes from different transponders that each send an enable code on a different frequency. Alternatively, a broadband reception with following signal analysis would be possible.

When the enable code also is personalized, then the transponder also is customized to a very specific computer and/or user. Possibilities for abuse therefore are even more limited, or are even more reliably suppressed.

When the transponder is a microprocessor, it can be employed and programmed especially flexibly.

DESCRIPTION OF THE DRAWINGS

FIG. 1 is a schematic illustration of a computer with a transponder.

FIG. 2 is a schematic illustration of the internal structure of the transponder of FIG. 1;.

FIGS. 3-6 are flowcharts for explaining the invention.

DESCRIPTION OF THE PREFERRED EMBODIMENTS

Figure 3:
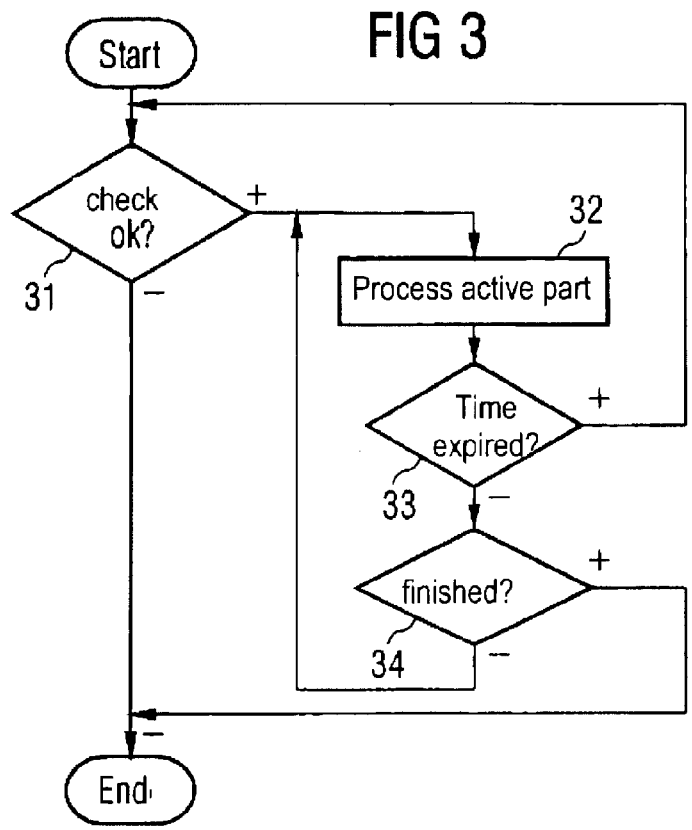

According to FIG. 1, a computer has a main unit 1 which internally includes a processor unit 2, a main memory 3 and a bulk storage 4. The bulk storage 4 is usually fashioned as a hard disk. Among other things, a computer program product 5 that includes a check routine 6 and an active part 7 is stored in the bulk storage 4. The computer thus is programmed with the computer program product 5.

At least one input device 8 (for example, a keyboard or a mouse) and at least one output device 9 (for example, a monitor) are connected to the main unit 1. An interactive operation of the computer 1 by a user 10 is possible via the input device 8 and the output device 9. In particular, it is possible for the user 10 to call the computer program product 5 by making corresponding entries. When the computer program product 5 is called, it is loaded from the bulk storage 4 into the main memory 3 and is processed by the computer.

A container 11 that, for example, can be secured to the main unit 1 also is allocated to the computer. A transponder 12 is arranged in the container 11. The transponder 12, thus, is separated from the computer.

The computer can bidirectionally communicate with the transponder 12 via a transceiver 13. To this end, the transceiver 13 is connected via an interface 14 to the processor unit 2 or to the computer in general. The interface 14 can, for example, by a USB interface.

The container 11 is high-frequency transparent so that communication of the transceiver 13 with the transponder 12.can ensue. As symbolically indicated by an eye 15 in FIG. 1, it is also optically transparent. As symbolically indicated by a padlock 16 in FIG. 1, the container 11 also can be locked.

According to FIG. 2, the transponder 12 has a microprocessor 17 as its central element. The operation of the microprocessor 17 is defined by a read-only memory 18 (ROM 18).

The microprocessor 17 also is connected to a demodulator 19, a modulator 20 and an internal transponder memory 21. The internal transponder memory 21 can be read from as well as written into by the microprocessor 17. Write events, i.e. modifications of the internal transponder memory 21, however, are irreversible. The internal transponder memory 21 thus is fashioned as a type of PROM.

The demodulator 19 is preceded by a reception coil 22; the modulator 20 is followed by a transmission coil 23. The two coils 22, 23 can be combined in a common element as warranted.

The reception coil 22 also is connected to an energy supply device 24. Upon reception of a launch signal with the reception coil 22, the other components 17 through 21 and 23 are supplied with energy by means of the energy supply device 24. The individual energy supply lines to these components 17 through 21, 23, however, are not shown in FIG. 2 for clarity.

The operation of the computer of the transponder 12 shall now be explained in detail in conjunction with FIGS. 3 through 6.

According to FIG. 3, a step 31 of the check routine 6 is first implemented when the user 10 calls the computer program product 5. The details of the check routine 6 shall be discussed below in conjunction with FIG. 4. As a result, a check is performed in step 31 to determine whether an enable code C2 satisfies an enable condition. Further steps 32 through 34 are run only when the enable code C2 meets the enable condition; otherwise, the processing of the computer program product 5 is ended.

The active part 7 is processed in step 32. The processing of the active part 7, however, is briefly interrupted repeatedly in order to check in a step 33 whether a waiting time of, for example, one minute has expired. If yes, step 33 branches back to step 31. From time to time, thus, the computer again undertakes the processing of the check routine 6 proceeding from the processing of the active part 7. Of course, the enable code C2 is again checked in step 31 for satisfaction of the enable condition, and the processing of the active part 7 is continued only when the enable code again satisfies the enable condition.

If the time expiration has not occurred in step 33, a branch is made to step 34 and a check is performed to determine whether the user 10 has entered and end command. If yes, the processing of the computer program product 5 is ended; otherwise, a branch is made back to the step 32.

The details of the processing of the check routine 6 are shown in FIG. 4. According to FIG. 4, the computer sends the transmission receiver 13 a transmission frequency f1, a reception frequency f2 and a launch code C1 in a step 35. The transmission frequency f1 is the frequency on which the transmission receiver 13 should send a launch signal to the transponder 12. The reception frequency f2 is the frequency on which the transmission receiver 13 should receive the enable code C2 from the transponder 12. The launch code C1 is a code that the transmission receiver 13 should communicate to the transponder 12 in the launch signal.

Fundamentally, the launch code C1 can be of an arbitrary nature, however, it preferably contains encoded particulars about an absolute time T that the computer knows on the basis of an internal clock module. It additionally contains encoded particulars about the computer or the computer type and/or user-specific particulars. Preferably, thus, it is personalized. Further, the launch code C1 also can contain a particular about whether the processing of the check routine 6 ensued when the computer program product 5 was called or ensued proceeding from the processing of the active part 7.

In a step 36, the transceiver 13 accepts the frequencies f1, f2 and the launch code C1. In a step 37, it then transmits the launch signal and the launch code C1 in the launch signal. The computer, thus, initiates it to transmit the launch signal.

In a step 38, the transponder 12 receives the launch signal and demodulates the launch code C1 from the launch signal. In a step 39, the microprocessor 17 then checks whether the communicated launch code Cl satisfies a launch condition. It thus checks, for example, whether the communicated absolute time T is greater than the last absolute time T that was transmitted (plausibility/manipulation check). Further, for example, it checks whether the corresponding, individual code features on whose basis the launch code C1 is personalized are satisfied.

The microprocessor 17 continues with further steps only when the launch code C1 is found proper, i.e. a launch condition has been met. Otherwise, it stops the further processing of its program stored in the ROM 18. In particular, it does not transmit the enable code C2 in this case.

When the launch code C1 meets the launch condition, the microprocessor 17 prepares for the check of a transmission condition. To this end, the microprocessor 17 first modifies the internal transponder memory 21 in a step 40. For example, the modification can ensue at every reception of a proper launch code C1 or only when the computer program product 5 is called. In both instances, however, the modification of the memory 21 is dependent on the usage of the computer program product 5.

In a step 41, the microprocessor 17 checks to determine whether the memory 21 can be modified further. It thus checks whether, as a result of previous modifications, all memory cells of the memory 21 already have been modified. When all memory cells of the memory 21 already have been modified, then the allowed use of the computer program product 5 is ended by the transponder 12. In this case, the transponder 12 does not transmit the enable code C2. In the present case, thus, the transmission condition is usage-dependent. When, in contrast, memory cells of the memory 21 still exist that can be modified, then the microprocessor 17 continues with a step 42.

In step 42, the microprocessor 17 checks whether the absolute time T stills lies below a time limit Tmax. It thus checks whether an absolute time condition has been met. If yes, then the validity duration of the transponder 12 has not yet expired. In this case, the enable code C2 is transmitted on the reception frequency f2 in a step 43. In the present case, thus, the transmission condition is also time-dependent.

In a step 44, the transmitted enable code C2 is received by the transmission receiver 13, demodulated and communicated to the computer. The computer accepts the enable code C2 in a step 45. In a step 46, the computer then checks the communicated enable code C2 for satisfaction of the enable condition. This last step 46 corresponds to the determination of the result which serves as a reference for a decision in step 31 of FIG. 3 as to whether the steps 32 through 34 are executed or not.

Figure 5:
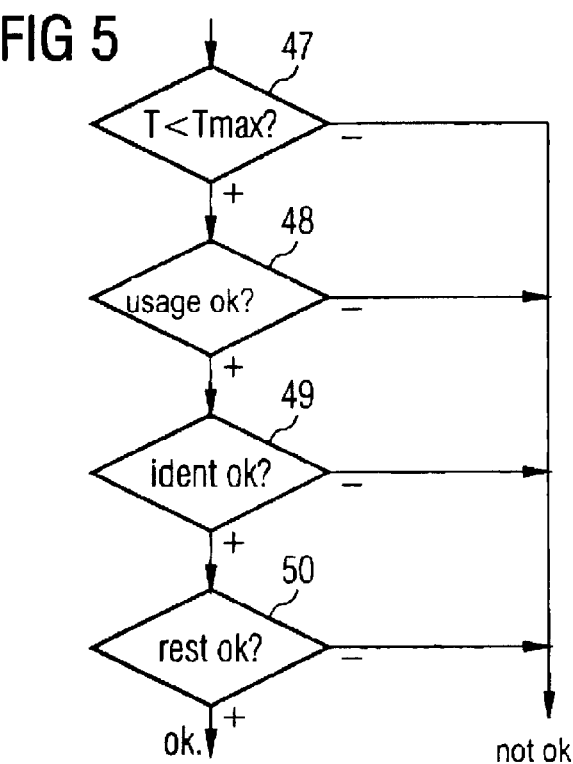

According to FIG. 5, this last step 46 can be subdivided into a number of steps 47 through 50. According to FIG. 5, for example, it is possible that the communicated enable code C2 contains the time limit Tmax in encoded form. As shown in step 47 in FIG. 5, a check can be carried out in this case to determine whether the absolute time T is still lower than the time limit Tmax.

For example, the enable code C2 can also contain the number of memory cells of the memory 21 that are still erasable. In this case, a check can be carried out in step 48 to see whether a further usage of the computer program product 5 is still permitted. In particular, thus, a check can be carried out to see whether the communicated number is greater than or equal to 0. Dependent on whether the modification of the memory 21 in step 40 ensued dependent on the number of calls of the computer program product 5 or dependent on the usage time, the check according to step 48 thus represents a check of the relative time or of the number of calls of the computer program product 5.

For example, a code that is specific for the user 10 and/or the computer can also be checked in step 49 when the enable code C2 contains corresponding elements. Finally, even more checks can ensue in step 50.

The processing of the active part 7 is undertaken or continued only when the enable code C2 has satisfied the respective check condition in all steps 47 through 50 of FIG. 5. Otherwise, the enable code C2 is not proper, so that the processing of the active part 7 is not taken up or, respectively, not continued.

Figure 6:
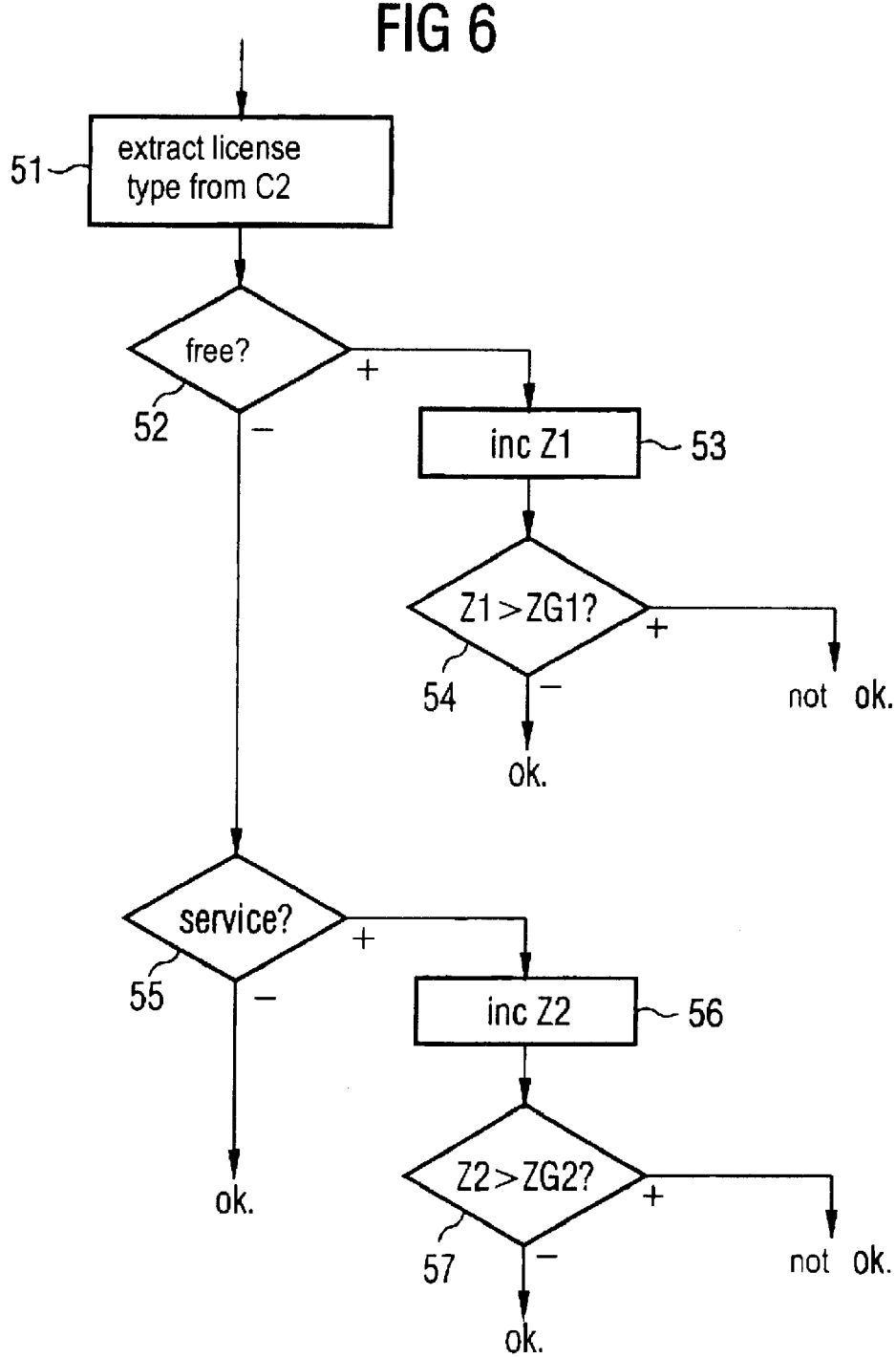

According to FIG. 6, the inventive method even makes it possible in a simple way to suppress the usage of the computer program product 5 even though the communicated enable code C2 meets the enable condition but certain other indicators of an abuse are present. The number of possible enable codes C2 is so large that specific code groups or code types can be formed. On the basis of the enable code C2, for example, one can recognize that the corresponding transponder 12 is a transponder 12 that was supplied cost-free for a trial use of the computer program product 5. Another code type, for example, can be characteristic therefor that the transponder 12 was originally issued to a service person for service purposes.

According to FIG. 6, the computer first extracts the code type of the enable code C2 in a step 51 following the processing of step 50. In a step 52, a check is then performed to determine whether the transponder 12 corresponds to a complimentary license for trial use of the computer program product 5, i.e. meets a first code condition. If yes, a corresponding counter Z1 is incremented in a step 53. A check is then carried out in a step 54 to determine whether the value of the counter Z1 exceeds a counter limit ZG1, i.e. violates a counter condition. If yes, this is an indication that the user 10 has fraudulently hoarded complimentary license transponders 12 and is thus attempting to avoid acquiring a payable license. When the counter limit ZG1 is upwardly transgressed by the counter Z1, the processing of the active part 7 is not undertaken or continued despite the satisfaction of the enable condition.

If the identified code type does not correspond to a complimentary license, a check is analogously performed in a step 55 to determine whether the identified code type corresponds to a service license that usually resides at the computer 1 for only a short time. When this is the case, a further counter Z2 is incremented in a step 56. Again, too, the value of the counter Z2 is compared to a further counter limit ZG2 in a step 57. If an upward transgression of the counter limit ZG2 is found in this case, it must be suspected that a service person has repeatedly, so to speak, "intentionally lost" his service license at the same computer 12. Despite the satisfaction of the enable condition, the processing of the active part 7 is not undertaken or not continued in this case, either.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for enabling an active part of a computer program, comprising the steps of:
   making a user application request into a computer that calls a computer program that includes a check routine and that starts execution of said computer program in said computer by processing said check routine in said computer, and while processing said check routine in said computer, said computer, only after and in response to said application request, initiating a transmitter connected to said computer to transmit a launch signal;
   receiving said launch signal at a transponder located remote from said computer, said transponder comprising an internal memory;
   at said transponder, upon reception of said launch signal, irreversibly modifying said internal memory and automatically making a determination as to whether said internal memory can be modified any further and transmitting an enable code from said transponder to a receiver at said computer only if said determination indicates said internal memory is able to be modified any further;
   receiving said enable code at said receiver and communicating said enable code from said receiver to said computer; and
   while continuing to process said check routine in said computer, said computer checking said enable code to determine if said enable code satisfies an enable condition, and processing an active part of said computer program in said computer only if and as long as said enable condition is satisfied.

2. A method as claimed in claim 1 comprising the additional steps of:
   during processing of said active part of said computer program in said computer, said computer multiply re-processing said check routine and, in each execution of said check routine, said computer initiating said transmitter to re-transmit said launch signal, said transponder receiving the re-transmitted launch signal and in response thereto again irreversibly modifying said internal memory, said transponder again checking whether said internal memory continues to be able to be modified any further and re-transmitting said enable code only if said internal memory continues to be able to be modified any further, said receiver receiving the re-transmitted enable code and said computer re-determining whether said re-transmitted enable code is preset and continuing processing of said active part of said computer program only if the enable code continues to be present.

3. A method as claimed in claim 1 wherein said enable condition is selected from the group consisting of a condition dependent on absolute time, a condition dependent on relative time, and a condition dependent on a number of calls of said computer program by said computer.

4. A method as claimed in claim 1 comprising the additional step of said transmitter including and transmitting a launch code in said launch signal, and wherein said transponder transmits said enable code only if said launch code satisfies a launch condition.

5. A method as claimed in claim 4 comprising generating said launch code in said computer and supplying said launch code to said transmitter from said computer.

6. A method as claimed in claim 5 comprising personalizing said launch code dependent on said computer.

7. A method as claimed in claim 1 comprising the additional steps in said computer, upon each communication of said enable code to said computer, of:
   incrementing a count of a counter when said enable condition is satisfied;
   checking said count to determine whether said count satisfies a counter condition upon each incrementation of said count of said counter;
   and processing said active part of said computer program only if said counter condition is satisfied.

8. A method as claimed in claim 1 comprising transmitting a frequency from said computer to said transmitter on which said launch signal is to be transmitted by said transmitter.

9. A method as claimed in claim 1 comprising transmitting a reception frequency from said computer to said receiver on which said receiver should receive said enable code.

10. A method as claimed in claim 1 comprising personalizing said enable code dependent on said computer.

11. A system for enabling an active part of a computer program, comprising:
    a computer having a user application request device that allows a user to enter an application request into said computer that calls a computer program that includes a check routine, said application request causing said computer to start executing said computer program by processing said check routine and said check routine causing said computer to generate a launch signal while processing said check routine only after and in response to said application request;
    a transmitter connected to said computer which is supplied with and transmits said launch signal;
    a transponder located remote from said computer, which receives said launch signal, said transponder comprising an internal memory;
    said transponder, upon receipt of said launch signal, being configured to irreversibly modify said internal memory and to automatically make a determination as to whether said internal memory can be modified any further, and transmitting an enable code only if said internal memory is able to be modified any further;
    a receiver connected to said computer for receiver said enable code and communicating said enable code to said computer; and
    while continuing to process said check routine in said computer, said computer being configured to check whether said enable code is present, and to process an active part of said computer program only when and as long as said enable code is present.

12. A system as claimed in claim 11 wherein said computer during processing of said active part of said computer program, multiply re-processes said check routine and, in each execution of said check routine, initiates said transmitter to re-transmit said launch signal, said transponder receiving the re-transmitted launch signal in response thereto again irreversibly modifying said internal memory and checking whether said internal memory continues to be able to be modified any further and re-transmitting said enable code only if said internal memory continues to be able to be modified any further, said receiver receiving the re-transmitted enable code and said computer re-determining whether said re-transmitted enable code is present and continuing processing of said active part of said computer program only if the re-transmitted enable code continues to be present.

13. A system as claimed in claim 11 wherein an enable condition is selected from the group consisting of a condition dependent on absolute time, a condition dependent on relative time, and a condition dependent on a number of calls of said computer program by said computer.

14. A system as claimed in claim 11 wherein said transmitter transmits a launch code in said launch signal, and wherein said transponder transmits said enable code only if said launch code satisfies a launch condition.

15. A system as claimed in claim 14 wherein said computer generates said launch code and wherein said computer supplies said launch code to said transmitter.

16. A system as claimed in claim 15 wherein said computer personalizes said launch code dependent on said computer.

17. A system as claimed in claim 11 wherein said computer includes a counter and wherein, upon each communication of said enable code to said computer, said computer increments a count of said counter when an enable condition is satisfied, checks said count to determine whether said count satisfies a counter condition upon each incrementation of said count of said counter, and processes said active part of said computer program only if said counter condition is satisfied.

18. A system as claimed in claim 11 wherein said computer transmits a frequency to said transmitter on which said launch signal is to be transmitted by said transmitter.

19. A system as claimed in claim 11 wherein said computer transmits a reception frequency from said receiver on which said receiver should receive said enable code.

20. A system as claimed in claim 11 wherein said computer personals said enable code dependent on said computer.

21. A computer-readable media encoded with data structures comprising programmed instructions comprising an active part and a check routine, said data structures being respectively loadable into a computer and into a transponder via said media and causing said computer, upon detecting an application request entered via a user input unit of said computer in said computer to start executing said programmed instructions by processing said check routine, and thereby causing said computer to initiate a transmitter connected to said computer to transmit a launch signal while processing said check routine only after and in response to said application request, and said data structures causing said transponder, upon receipt of said launch signal, to irreversibly modify an internal memory of said transponder and to automatically make a determination as to whether said internal memory can be modified any further, and to transmit an enable code only if said internal memory is able to be modified any further, and, upon receipt of said enable code by said computer from said transponder following transmittal of said launch signal, said data structures causing said computer to check said enable code in said check routine to determine if and when said enable code is present, and said check routine allowing processing of said active part of said data structures in said computer only when said enable code is present, and said data structures comprising a transponder program loadable into a transponder processor of said transponder, said transponder program causing said transponder to generate said enable code only if and as long as said launch signal satisfies a predetermined transmission condition.

* * * * *